(12) United States Patent
Deng (10) Patent No.: US 11,907,026 B2
(45) Date of Patent: Feb. 20, 2024

(54) ROTATABLE CONNECTOR ASSEMBLY AND FOLDABLE TERMINAL DEVICE

(71) Applicant: VIVO MOBILE COMMUNICATION CO., LTD., Chang'an Dongguan (CN)

(72) Inventor: Yongjin Deng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 399 days.

(21) Appl. No.: 17/388,577

(22) Filed: Jul. 29, 2021

(65) Prior Publication Data

US 2021/0357000 A1 Nov. 18, 2021

Related U.S. Application Data

(63) Continuation of application No. PCT/CN2020/071922, filed on Jan. 14, 2020.

(30) Foreign Application Priority Data

Jan. 29, 2019 (CN) .......................... 201910086265.0

(51) Int. Cl.
*G06F 1/16* (2006.01)
*H04M 1/02* (2006.01)

(52) U.S. Cl.
CPC .......... *G06F 1/1681* (2013.01); *G06F 1/1652* (2013.01); *H04M 1/0268* (2013.01)

(58) Field of Classification Search
CPC .... G06F 1/1652; G06F 1/1681; G06F 1/1616; G06F 1/1641; G06F 1/16; G06F 1/1626; G06F 1/1656; H04M 1/0268; H04M 1/022; H04M 1/0216; H04M 1/0237; H04M 1/02; H04M 1/0222; H04M 1/0247; H04M 1/0249
See application file for complete search history.

(56) References Cited

U.S. PATENT DOCUMENTS

| 2009/0051830 | A1  | 2/2009  | Matsushita |
| 2015/0366089 | A1* | 12/2015 | Park ...................... G06F 1/1641 |
|              |     |         | 361/679.01 |
| 2016/0007441 | A1  | 1/2016  | Matsueda |

(Continued)

FOREIGN PATENT DOCUMENTS

| CN | 104506688 A | 4/2015 |
| CN | 206619066 U | 11/2017 |

(Continued)

OTHER PUBLICATIONS

South Korean Request for the Submission of an Opinion for related Application No. 10-2021-7026193; dated Jan. 12, 2023.
(Continued)

*Primary Examiner* — Abhishek M Rathod
(74) *Attorney, Agent, or Firm* — von Briesen & Roper, s.c.

(57) ABSTRACT

A rotatable connector assembly includes a base and two connector members respectively connected to two sides of the base, where each of the connector members includes a first hinge and a second hinge, and both sides of the base are provided with a first sliding slot; one end of the first hinge is slidably connected to the first sliding slot and rotates with respect to the base, and the other end of the first hinge is hinged to one end of the second hinge; the rotatable connector assembly has an unfolded state and a folded state.

20 Claims, 4 Drawing Sheets

(56) References Cited

U.S. PATENT DOCUMENTS

| | | | |
|---|---|---|---|
| 2017/0115701 A1 | 4/2017 | Bae et al. | |
| 2017/0201607 A1 | 7/2017 | Xu | |
| 2019/0032380 A1 | 1/2019 | Wu et al. | |
| 2020/0267851 A1* | 8/2020 | Hou | H04M 1/022 |
| 2020/0355216 A1* | 11/2020 | Bae | G06F 1/1652 |
| 2020/0363843 A1* | 11/2020 | Cheng | H04M 1/02 |

FOREIGN PATENT DOCUMENTS

| | | |
|---|---|---|
| CN | 108076171 A | 5/2018 |
| CN | 108428408 A | 8/2018 |
| CN | 108512952 A | 9/2018 |
| CN | 109780403 A | 5/2019 |
| EP | 1670218 A1 | 6/2006 |
| JP | 2011034087 A | 2/2011 |
| JP | 2016015618 A | 1/2016 |
| KR | 20060064951 A | 6/2006 |
| KR | 20170103268 A | 9/2017 |
| WO | 2016085182 A1 | 6/2016 |

OTHER PUBLICATIONS

Extended European Search Report related to Application No. 20748259.7; dated Mar. 2, 2022.
International Search Report & Written Opinion related to Application No. PCT/CN2020/071922; dated Aug. 12, 2021.
First Japanese Office Action related to Application No. 2021-544222; dated Aug. 4, 2022.

* cited by examiner

ROTATABLE CONNECTOR ASSEMBLY AND FOLDABLE TERMINAL DEVICE

CROSS-REFERENCE TO RELATED APPLICATIONS

This application is continuation application of PCT International Application No. PCT/CN2020/071922 filed on Jan. 14, 2020, which claims priority to Chinese Patent Application No. 201910086265.0, filed in China on Jan. 29, 2019, the disclosures of which are incorporated herein by reference in their entireties.

TECHNICAL FIELD

This disclosure relates to a rotatable connector assembly and a foldable terminal device.

BACKGROUND

As user demands increase, large-screen terminal devices are increasingly favored by users. With a large screen, display performance of the terminal device can be improved. However, a larger screen area usually leads to a larger size of the terminal device, affecting portability of the terminal device. The larger size makes it difficult for users to hold the terminal device, adding to the inconvenience of carrying.

With popularization of flexible displays, an increasing number of foldable terminal devices have emerged which are equipped with flexible displays. In an unfolded state, the flexible display unfolds to form a larger area, so as to obtain a larger display area; and in a folded state, the flexible display makes the foldable terminal have a smaller size, convenient for users to carry.

Generally, two connected folding portions of the foldable terminal device rotate with respect to each other to implement switching between the unfolded state and the folded state. When the flexible display is in the folded state, there is a bending portion at a bending position of the flexible display, and the bending portion of the flexible display is prone to squeezing of a housing to have stacking folds, thereby easily causing damages to the flexible display.

SUMMARY

This disclosure discloses a rotatable connector assembly.

This disclosure employs the following technical solutions:

A rotatable connector assembly includes a base and two connector members respectively connected to two sides of the base, where each of the connector members includes a first hinge and a second hinge, and two sides of the base are provided with a first sliding slot; one end of the first hinge is slidably connected to the first sliding slot and rotates with respect to the base, and the other end of the first hinge is hinged to one end of the second hinge; the rotatable connector assembly has an unfolded state and a folded state, where in the unfolded state, the two connector members connected to the two sides of the base extend in a direction away from each other; and in the folded state, the two connector members connected to the two sides of the base are stacked, the first hinge and the second hinge of each of the connector members are bent to form a recess at a hinged position, and the recesses formed in the two connector members are joined to form an accommodating space.

A foldable terminal device includes a flexible display, two housings, and the rotatable connector assembly described above, where the two housings are respectively connected to two connector members, the two housings and the rotatable connector assembly form a mounting plane, and the flexible display is mounted onto the mounting plane.

BRIEF DESCRIPTION OF DRAWINGS

The drawings described herein are used to provide a further understanding about this disclosure, and constitute a part of this disclosure. Exemplary embodiments of this disclosure and descriptions thereof are used to explain this disclosure, but do not constitute any inappropriate limitation on this disclosure. In the accompanying drawings.

Reference signs are described as follows:

100: rotatable connector assembly; 110: base; 111: first sliding slot; 112: second sliding slot; 113: threaded hole; 120: connector member; 121: first hinge; 122: second hinge; 123: third hinge; 123a: side plate; 123a1: strip-shaped hole; 123a2: connecting hole; 123a3: lapping step; 123a4: first limiting element; 123a5: second limiting element; 123b: middle plate; 124: connecting block; 125: coupling shaft; 130: screw;

200: flexible display;

300: housing; 310: battery cover; 320: mainboard top cover; 321: supporting block; 330: in-housing space;

400: secondary display;

A: recess; B: first gap; and C: second gap.

DESCRIPTION OF EMBODIMENTS

To make the objectives, technical solutions, and advantages of this disclosure clearer, the following clearly describes the technical solutions of this disclosure with reference to specific embodiments of this disclosure and corresponding drawings. Apparently, the described embodiments are merely a part rather than all of the embodiments of this disclosure. All other embodiments that a person of ordinary skill in the art obtains based on the embodiments of this disclosure shall fall within the protection scope of this disclosure.

This disclosure discloses a rotatable connector assembly to resolve the problem that when a foldable terminal device is in a folded state, a flexible display is prone to have stacking folds at a bending portion.

The technical solutions disclosed in the embodiments of this disclosure are described in detail below with reference to the accompanying drawings.

Refer to FIG. 1 to FIG. 7. An embodiment of this disclosure discloses a rotatable connector assembly 100, where the disclosed rotatable connector assembly 100 includes a base 110 and two connector members 120.

Figure 1:
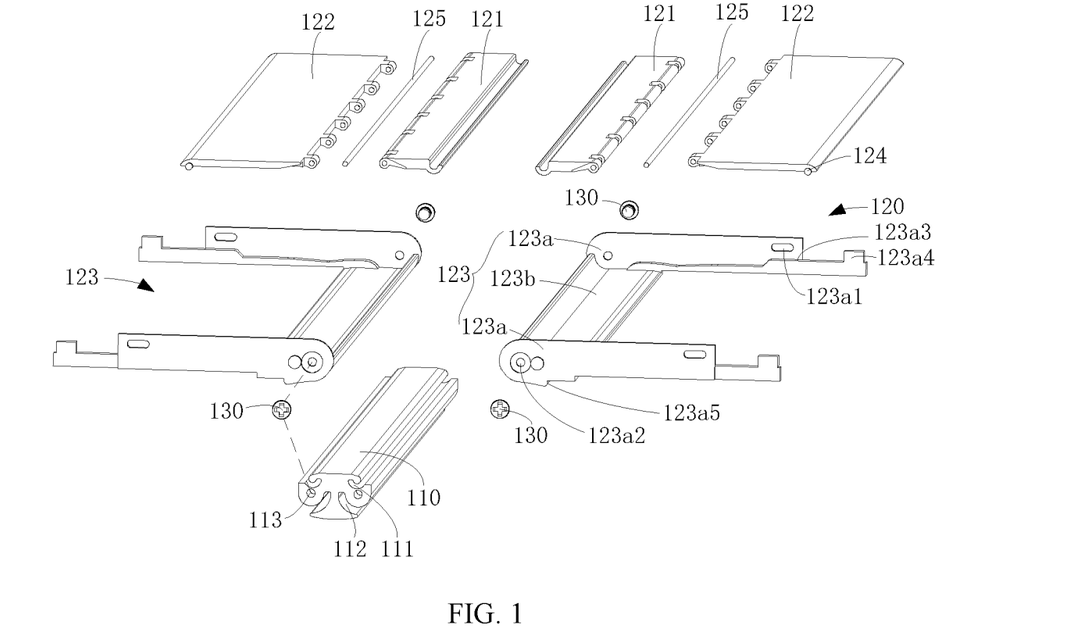
FIG. 1 is a schematic exploded view of a rotatable connector assembly disclosed in an embodiment of this disclosure.

In this embodiment, both sides of the base 110 are provided with a first sliding slot 111. Generally, the base 110 is a special-shaped columnar structure, and the base 110 provides an installation foundation for the connector members 120.

The two connector members 120 are respectively connected to two sides of the base 110. Each of the connector members 120 includes a first hinge 121 and a second hinge 122. One end of the first hinge 121 is slidably connected to the first sliding slot 111 and rotates with respect to the base 110. The first hinge 121 sliding in the first sliding slot 111 allows the first hinge 121 to rotate with respect to the base 110. Specifically, the first sliding slot 111 may be an arc slot. The other end of the first hinge 121 is hinged to one end of the second hinge 122, and the first hinge 121 and the second hinge 122 rotate with respect to each other. A whole formed by the first hinge 121 and the second hinge 122 is able to rotate with respect to the base 110. Specifically, the first hinge 121 may be hinged to the second hinge 122 through a coupling shaft 125.

The rotatable connector assembly 100 disclosed in this embodiment may be applied in a foldable terminal device, and may be used to connect two folding parts of the foldable terminal device (for example, the housings described hereinafter).

The rotatable connector assembly 100 disclosed in this embodiment has an unfolded state and a folded state. For the foldable terminal device that includes the rotatable connector assembly 100, when the rotatable connector assembly 100 is in the unfolded state, the whole foldable terminal device is in the unfolded state; and when the rotatable connector assembly 100 is in the folded state, the whole foldable terminal device is in the folded state.

Refer to FIG. 2 again. When the rotatable connector assembly 100 is in the unfolded state, the two connector members 120 connected to the two sides of the base 110 extend in a direction away from each other. Generally, in the unfolded state, both the first hinges 121 and the second hinges 122 of the two connector members 120 are located in a same plane, so that the foldable terminal device can be unfolded, thereby unfolding a flexible display 200 of the foldable terminal device.

Figure 5:
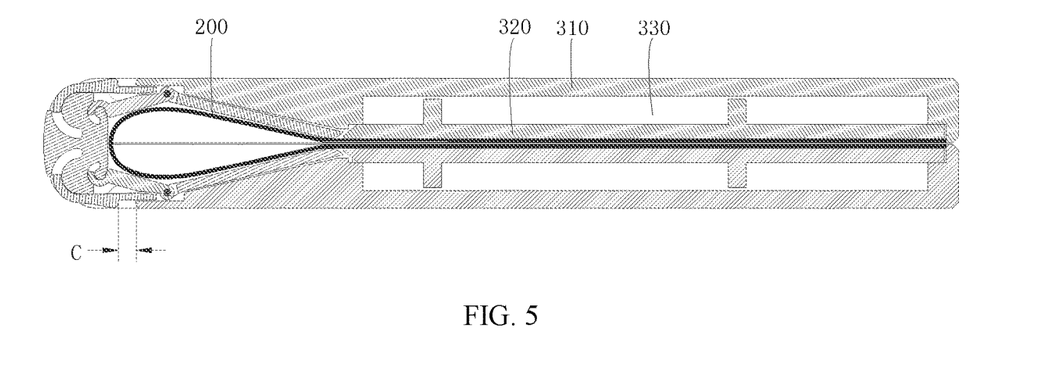
FIG. 5 is a schematic structural diagram of a foldable terminal device in a folded state disclosed in an embodiment of this disclosure.
Figure 6:
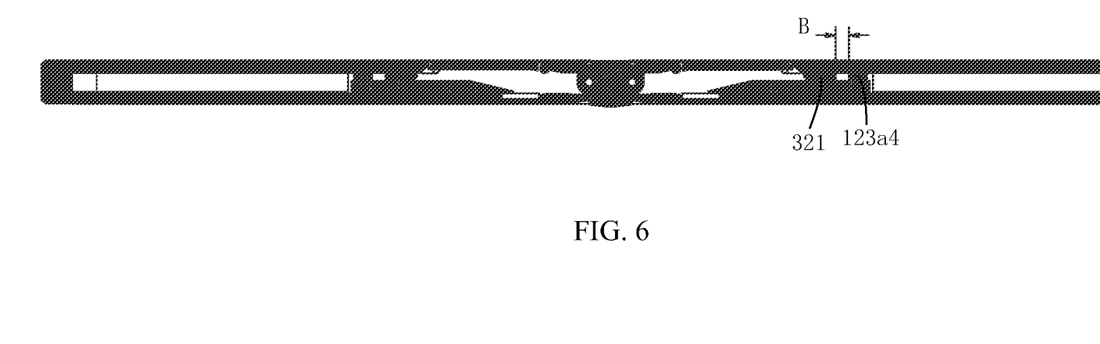
FIG. 6 is a schematic structural diagram of a foldable terminal device in an unfolded state disclosed in an embodiment of this disclosure.

Refer to FIG. 3 again. When the rotatable connector assembly 100 is in the folded state, the two connector members 120 connected to the two sides of the base 110 are stacked. Meanwhile, the first hinge 121 and the second hinge 122 of each of the connector members 120 are bent to form a recess A at a hinged position, and the recesses A formed in the two connector members 120 are joined to form an accommodating space. The accommodating space is used to accommodate a bending portion of the flexible display 200 that is bent, as shown in FIG. 5. The recess A is essentially formed by the first hinge 121 and the second hinge 122 of each of the connector members 120 rotating with respect to each other at a specified angle.

The rotatable connector assembly 100 disclosed in the embodiment of this disclosure has an unfolded state and a folded state. When applied to a foldable terminal device equipped with a flexible display 200, the rotatable connector assembly 100 can have the same unfolded state and folded state as the foldable terminal device. In the folded state, the first hinge 121 and the second hinge 122 of each of the connector members 120 are bent to form a recess A at the hinged position. When the two connector members 120 are stacked, the respectively formed recesses A are join to form an accommodating space, so as to well accommodate a bending portion of the flexible display 200, avoiding that the bending portion is squeezed to have stacking folds. Therefore, the rotatable connector assembly disclosed in the embodiments of this disclosure is undoubtedly able to resolve the problem in related technologies that when a foldable terminal device is in a folded state, a flexible display is prone to have stacking folds at a bending position.

In order to facilitate the connection to other components (for example, the housings 300 described hereinafter) of the foldable terminal device, in an optional solution, the connector members 120 may further include two third hinges 123 respectively connected to the two sides of the base 110. Both sides of the base 110 are provided with a second sliding slot 112, and one end of the third hinge 123 is slidably connected to the second sliding slot 112 and rotates with respect to the base 110. When the rotatable connector assembly 100 is folded or unfolded, the third hinge 123 is able to rotate with respect to the base 110 by sliding in the second sliding slot 112. The other end of the second hinge 122 is slidably connected to the other end of the third hinge 123, thereby being able to adapt to the difference between the rotation of the third hinge 123 and the rotation of the second hinge 122.

Generally, the first sliding slot 111 and the second sliding slot 112 are respectively arranged at a top and a bottom of the base 110, and the other end of the third hinge 123 is slidably connected to the other end of the second hinge 122, thereby allowing a whole formed by the third hinge 123, the second hinge 122, and the first hinge 121 to rotate together.

In this embodiment, the first hinge 121 and the second hinge 122 may have various structures. In order to better support the flexible display 200, in an optional solution, both the first hinge 121 and the second hinge 122 may be plate-like structures. Specifically, in the unfolded state, the first hinge 121 and the second hinge 122 may be joined to form a support plane that can support part of the flexible display 200.

Figure 2:
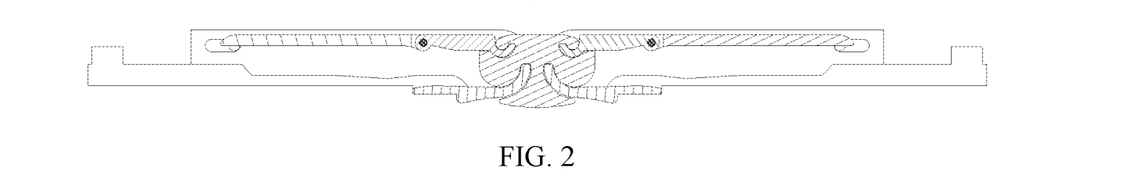
FIG. 2 is a schematic structural diagram of a rotatable connector assembly in an unfolded state disclosed in an embodiment of this disclosure.
Figure 3:
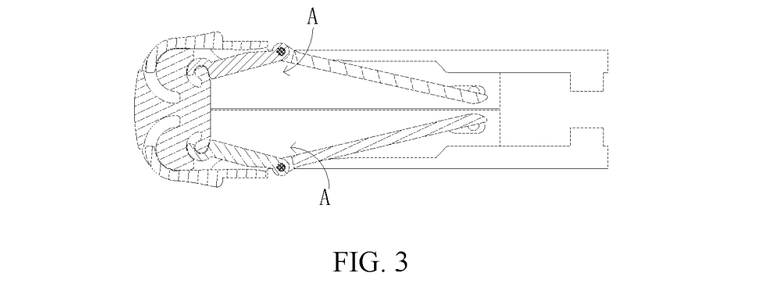
FIG. 3 is a schematic structural diagram of a rotatable connector assembly in a folded state disclosed in an embodiment of this disclosure.

The third hinge 123 may have various structures. Refer to FIG. 1 to FIG. 3 again. In a specific embodiment, each of the third hinges 123 may include two side plates 123a and a middle plate 123b, where the middle plate 123b is connected between one end of each of the two side plates 123a, and the other ends of the two side plates 123a extend in a direction away from the middle plate 123b. The middle plate 123b is slidably connected to the second sliding slot 112, thereby allowing the third hinge 123 to rotate with respect to the base 110 through sliding.

The other end of each of the side plates 123a is provided with a strip-shaped hole 123a1. Generally, the strip-shaped hole 123a1 extends in the direction away from the middle plate 123b. In this embodiment, the first hinge 121 and the second hinge 122 are arranged between two side plates 123a that are on a same side of the base 110 as the first hinge 121 and the second hinge 122. The second hinge 122 is provided with a connecting block 124, and the connecting block 124 is slidably connected to the strip-shaped hole 123a1. In this case, the third hinge 123 is equivalent to supporting the first hinge 121 and the second hinge 122, and the first hinge 121 and the second hinge 122 are able to rotate with the third hinge 123.

During operation, one end of the first hinge 121 slidably cooperates with the first sliding slot 111 of the base 110, one end of the third hinge 123 slidably cooperates with the second sliding slot 112 of the base 110, and the third hinge 123 is connected to the second hinge 122 through cooperation of the connecting block 124 and the strip-shaped hole 123a1, thereby allowing the first hinge 121, the second hinge 122, and the third hinge 123 to rotate synchronously.

In a design process, the synchronous rotation of the foregoing rotating elements may be achieved by adjusting a size of the first sliding slot 111 and a size of the second sliding slot 112.

In a specific assembly process, a notch of the first sliding slot 111 is an end portion formed by sliding of the first hinge 121. In order to avoid the first hinge 121 separating from the first sliding slot 111, in an optional solution, the notch of the first sliding slot 111 may be provided as a captive notch that is able to prevent the first hinge 121 from separating from the first sliding slot 111. In the same way, a notch of the second sliding slot 112 may also be provided as a captive notch that is able to prevent the third hinge 123 from separating from the second sliding slot 112. An end part of the first hinge 121 may be hooked to the captive notch of the first sliding slot 111. Certainly, during an installation process, the end part of the first hinge 121 may pass through the captive notch of the first sliding slot 111 through deformation, thereby extending into the first sliding slot 111 and slidably cooperating with the first sliding slot 111. In the same way, an end part of the third hinge 123 may also pass through the captive notch of the second sliding slot 112 through deformation, thereby extending into the second sliding slot 112 and slidably cooperating with the second sliding slot 112.

Certainly, the connector members 120 may be connected to the base 110 through other structures. Refer to FIG. 1 to FIG. 3 again. End planes of the base 110 may be provided with threaded holes 113, and each of the side plates 123a is disposed on an outer side of an end plane corresponding to the base 110. The rotatable connector assembly 100 may further include screws 130, where the screw 130 passes through a connecting hole 123a2 of the side plate 123a and is fastened to the base 110. The side plate 123a rotatably cooperates with a corresponding screw 130. In this case, the connector member 120 is rotatably connected to the screw 130 fastened to the base 110 through the side plate 123a, thereby achieving the connection to the base 110. In this case, the cooperation of the screw 130 and the side plate 123a enables the first hinge 121 and the second hinge 122 to slide respectively along the first sliding slot 111 and the second sliding slot 112, without separating from the first sliding slot 111 and the second sliding slot 112.

Based on the rotatable connector assembly 100 disclosed in the embodiments of this disclosure, an embodiment of this disclosure discloses a foldable terminal device. The disclosed foldable terminal device includes a flexible display 200, two housings 300, and the foregoing rotatable connector assembly 100. The two housings 300 are respectively connected to the two connector members 120, the two housings 300 and the rotatable connector assembly 100 form a mounting plane, and the flexible display 200 is mounted onto the mounting plane.

Specifically, the housings 300 are basic elements of the foldable terminal device, providing other components (such as a circuit board and a battery) of the foldable terminal device with a mounting space. The housings 300 may have various structures. In a specific embodiment, the housings 300 may include a battery cover 310 and a mainboard top cover 320 connected to the battery cover 310, where the mainboard top cover 320, the first hinge 121, and the second hinge 122 can form the foregoing mounting plane. When the foldable terminal device disclosed in this embodiment is in a folded state, the flexible display 200 is able to be folded and hidden, as shown in FIG. 5. The mainboard top cover 320 may be fastened onto the battery cover 310 through engaging, or certainly may be fastened through a connecting element (for example, a threaded connecting element).

Figure 4:
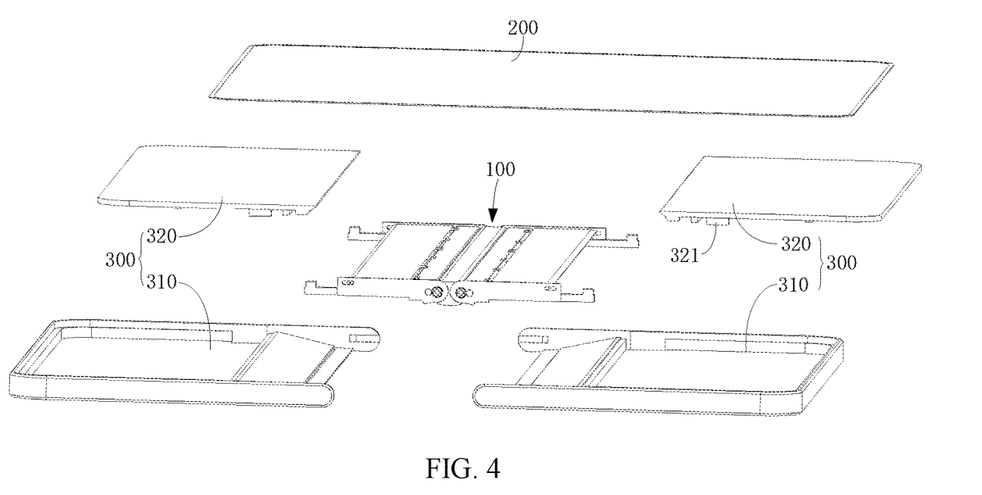
FIG. 4 is a schematic exploded view of a foldable terminal device disclosed in an embodiment of this disclosure.

The connector member 120 may be connected to a corresponding housing 300 in various manners. For example, the housing 300 is directly fastened onto the connector member 120 through an engaging structure, a connecting element (for example, a threaded connecting element), or the like. Refer to FIG. 4 to FIG. 6 again. In an optional solution, the end part of the side plate 123a is slidably connected to an in-housing space 330 formed by the battery cover 310 and the mainboard top cover 320. The foregoing side plate 123a is slidably connected to the in-housing space 330, thereby well adapting to movements of the third hinge 123 along the second sliding slot 112 during rotation.

In an optional solution, an inner wall of the side plate 123a may be provided with a lapping step 123a3, the mainboard top cover 320 is provided with a support block 321, and the support block 321 supports the lapping step 123a3. After mounted onto the battery cover 310, the mainboard top cover 320 can be fixed to a position in the assembly through the cooperation of the support block 321 and the lapping step 123a3.

Specifically, the lapping step 123a3 may extend into the in-housing space 330. An end part of the lapping step 123a3 that can extend into the in-housing space 330 may be provided with a first limiting element 123a4. In the unfolded state, a first gap B is reserved between the first limiting element 123a4 and the support block 321, and in the folded state, the first limiting element 123a4 is in position-limited contact with the support block 321. Because the elements of the foldable terminal device have different motions during switching between the unfolded state and the folded state, in a folding process, the first gap B between the first limiting element 123a4 and the support block 321 reduces gradually until the first limiting element 123a4 and the support block 321 are in position-limited contact with each other. At this point, the foldable terminal device is in the folded state.

Each of the third hinges 123 may include a second limiting element 123a5. Specifically, the side plate 123a may be arranged at the second limiting element 123a5. In the folded state, the battery cover 310 is arranged on an outer side of a corresponding third hinge 123. A second gap C may be formed between the battery cover 310 and the second limiting element 123a5. In the unfolded state, the battery cover 310 is in butt contact with the second limiting element 123a5. In this case, the battery cover 310 abuts against the second limiting element 123a5, preventing the foldable terminal device from excessive rotation when unfolded.

Figure 7:
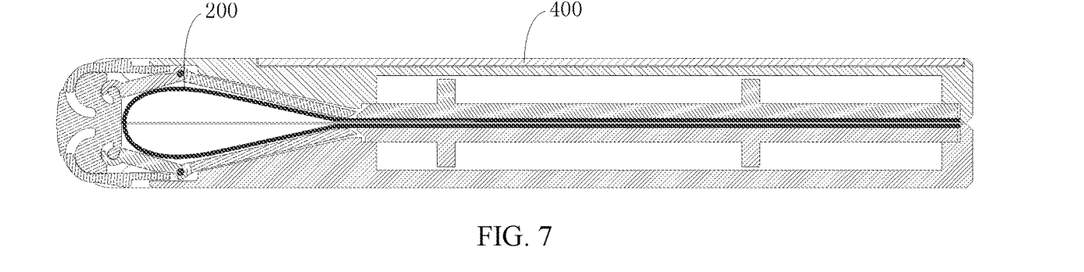
FIG. 7 is a schematic structural diagram of another foldable terminal device in a folded state disclosed in an embodiment of this disclosure.

Refer to FIG. 7. In an optional solution, at least one of the two housings 300 is provided with a secondary display 400 on a side away from the mounting plane, meaning that the flexible display 200 and the secondary display 400 are respectively provided on two sides of the housing 300. The secondary display 400 makes the foldable terminal device still usable when in the folded state.

The foldable terminal device in the embodiments of this disclosure may be a terminal device such as a mobile phone, a tablet computer, an e-book reader, a game console, or a wearable device (such as a smartwatch). The embodiments of this disclosure do not limit the specific type of the foldable terminal device.

The above embodiments of this disclosure focus on the differences between the embodiments. As long as different features of improvement in the embodiments are not contradictory, they can be combined to form a more preferred embodiment. Further descriptions are omitted herein for the purpose of brevity.

The foregoing descriptions are only embodiments of this disclosure, but this disclosure is not limited to such embodiments. For a person skilled in the art, this disclosure may have various changes and variations. Any modification, equivalent replacement, and improvement made without departing from the spirit and principle of this disclosure shall fall within the protection scope of the claims of this disclosure.

What is claimed is:

1. A rotatable connector assembly, comprising a base and two connector members respectively connected to two sides of the base, wherein each of the connector members comprises a first hinge and a second hinge, and both sides of the base are provided with a first sliding slot; one end of the first hinge is slidably connected to the first sliding slot and rotates with respect to the base, and the other end of the first hinge is hinged to one end of the second hinge; the rotatable connector assembly has an unfolded state and a folded state, wherein in the unfolded state, the two connector members connected to the two sides of the base extend in a direction away from each other; and in the folded state, the two connector members connected to the two sides of the base are stacked, the first hinge and the second hinge of each of the connector members are bent to form a recess at a hinged position, and the recesses formed in the two connector members are joined to form an accommodating space.

2. The rotatable connector assembly according to claim 1, wherein the connector members further comprise two third hinges respectively connected to the two sides of the base; both sides of the base are provided with a second sliding slot; one end of the third hinge is slidably connected to the second sliding slot and rotates with respect to the base; and the other end of the second hinge is slidably connected to the other end of the third hinge.

3. The rotatable connector assembly according to claim 2, wherein both the first hinge and the second hinge are plate-like structures.

4. The rotatable connector assembly according to claim 3, wherein in the unfolded state, the first hinge and the second hinge are joined to form a support plane.

5. The rotatable connector assembly according to claim 3, wherein each of the third hinges comprises two side plates and a middle plate, the middle plate is connected between one end of each of the two side plates, and the other end of each of the side plates is provided with a strip-shaped hole; the first hinge and the second hinge are arranged between two side plates that are on a same side of the base as the first hinge and the second hinge; the second hinge is provided with a connecting block, and the connecting block is slidably connected to the strip-shaped hole; the first hinge and the second hinge rotate with the third hinge; and the middle plate is slidably connected to the second sliding slot.

6. The rotatable connector assembly according to claim 5, wherein end planes of the base are provided with threaded holes, and each of the side plates is disposed on an outer side of an end plane corresponding to the base, and the rotatable connector assembly further comprises screws, wherein the screw passes through a connecting hole of the side plate and is fastened to the base, and the side plate rotatably cooperates with a corresponding screw.

7. A foldable terminal device, comprising a flexible display, two housings, and the rotatable connector assembly according to claim 5, wherein the two housings are respectively connected to the two connector members, the two housings and the rotatable connector assembly form a mounting plane, and the flexible display is mounted on the mounting plane.

8. The foldable terminal device according to claim 7, wherein the housing comprises a battery cover and a mainboard top cover connected to the battery cover, and the mainboard top cover, the first hinge, and the second hinge form the mounting plane.

9. The foldable terminal device according to claim 8, wherein an end part of the side plate is slidably connected to an in-housing space formed by the battery cover and the mainboard top cover.

10. The foldable terminal device according to claim 9, wherein an inner wall of the side plate is provided with a lapping step, the mainboard top cover is provided with a support block, and the support block supports the lapping step.

11. The foldable terminal device according to claim 10, wherein the lapping step extends into the in-housing space, and an end part of the lapping step extending into the in-housing space is provided with a first limiting element; in an unfolded state, a first gap is reserved between the first limiting element and the support block; and in a folded state, the first limiting element is in position-limited contact with the support block.

12. The foldable terminal device according to claim 8, wherein a third hinge comprises a second limiting element; in the folded state, the battery cover is arranged on an outer side of a corresponding third hinge, and a second gap is formed between the battery cover and the second limiting element; and in the unfolded state, the battery cover is in butt contact with the second limiting element.

13. The foldable terminal device according to claim 7, wherein at least one of the two housings is provided with a secondary display on a side away from the mounting plane.

14. The foldable terminal device according to claim 7, wherein end planes of the base are provided with threaded holes, and each of the side plates is disposed on an outer side of an end plane corresponding to the base, and the rotatable connector assembly further comprises screws, wherein the screw passes through a connecting hole of the side plate and is fastened to the base, and the side plate rotatably cooperates with a corresponding screw.

15. The foldable terminal device according to claim 14, wherein the housing comprises a battery cover and a mainboard top cover connected to the battery cover, and the mainboard top cover, the first hinge, and the second hinge form the mounting plane.

16. A foldable terminal device, comprising a flexible display, two housings, and the rotatable connector assembly according to claim 1, wherein the two housings are respectively connected to the two connector members, the two housings and the rotatable connector assembly form a mounting plane, and the flexible display is mounted on the mounting plane.

17. The foldable terminal device according to claim 16, wherein at least one of the two housings is provided with a secondary display on a side away from the mounting plane.

18. The foldable terminal device according to claim 16, wherein the connector members further comprise two third hinges respectively connected to the two sides of the base; both sides of the base are provided with a second sliding slot; one end of the third hinge is slidably connected to the second sliding slot and rotates with respect to the base; and the other end of the second hinge is slidably connected to the other end of the third hinge.

19. The foldable terminal device according to claim 18, wherein both the first hinge and the second hinge are plate-like structures.

20. The foldable terminal device according to claim 19, wherein in the unfolded state, the first hinge and the second hinge are joined to form a support plane.

\* \* \* \* \*